(No Model.) 2 Sheets—Sheet 2.

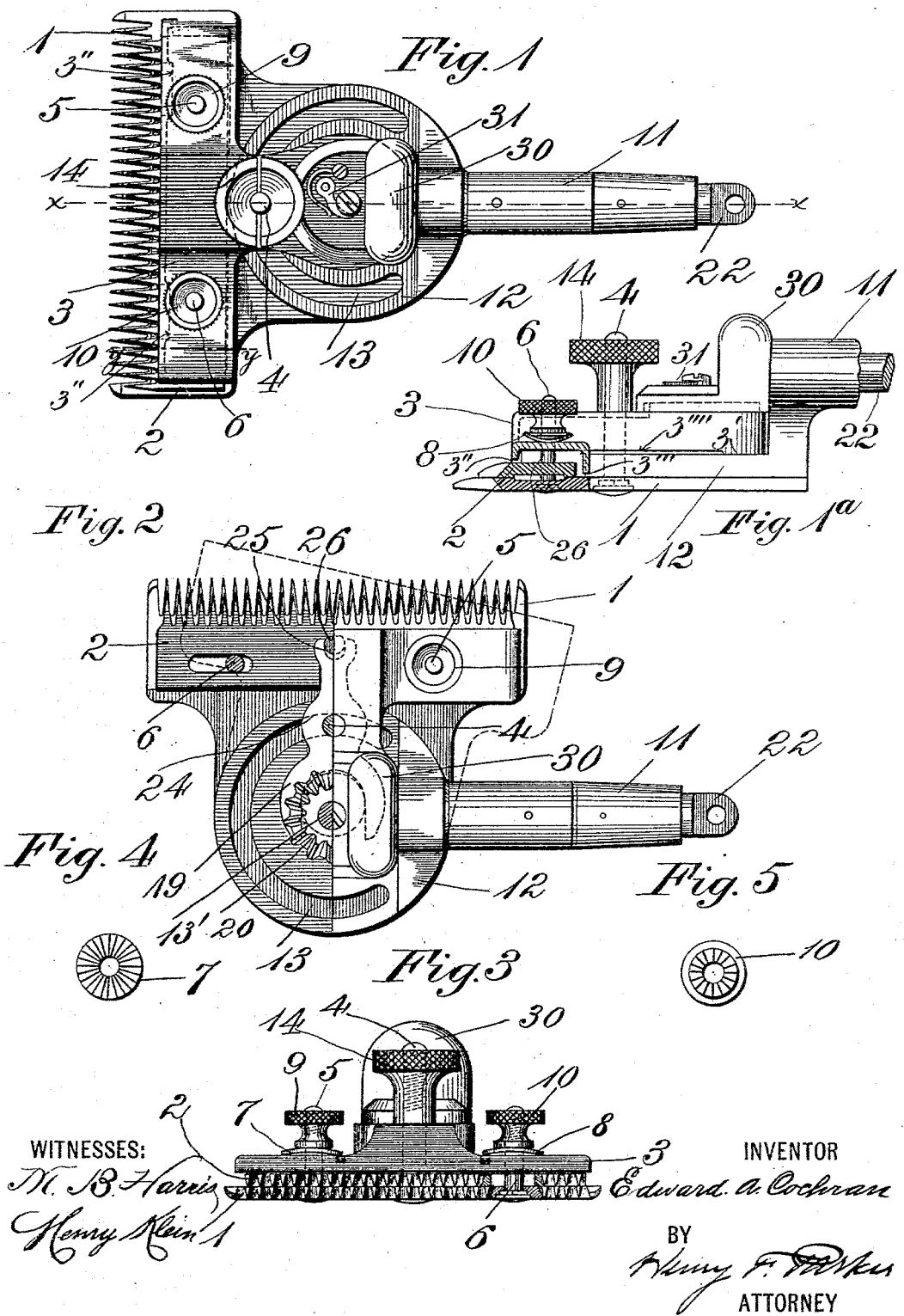

E. A. COCHRAN.
SHEARING CLIPPERS.

No. 511,125. Patented Dec. 19, 1893.

WITNESSES:
M. B. Harris
Henry Klein

INVENTOR
Edward A. Cochran
BY
Henry F. Parker
ATTORNEY

UNITED STATES PATENT OFFICE.

EDWARD A. COCHRAN, OF BROOKLYN, NEW YORK.

SHEARING-CLIPPERS.

SPECIFICATION forming part of Letters Patent No. 511,125, dated December 19, 1893.

Application filed January 11, 1893. Serial No. 458,015. (No model.)

*To all whom it may concern:*

Be it known that I, EDWARD A. COCHRAN, a citizen of the United States, residing at Brooklyn, in the county of Kings and State of New York, have invented certain new and useful Improvements in Shearing-Clippers, of which the following is a specification.

This invention relates to horse clipping machines, and is also applicable to other purposes; and said invention more especially relates to reciprocating clippers, wherein a comb-plate and cutter-plate, bearing a series of shearing teeth, are adjustable at variable angles to the shank or body of the tool.

The invention consists in the construction and novel arrangement of parts as hereinafter described and more particularly pointed out in the appended claims.

The invention also consists in certain other details of construction hereinafter set forth.

Figure 6:
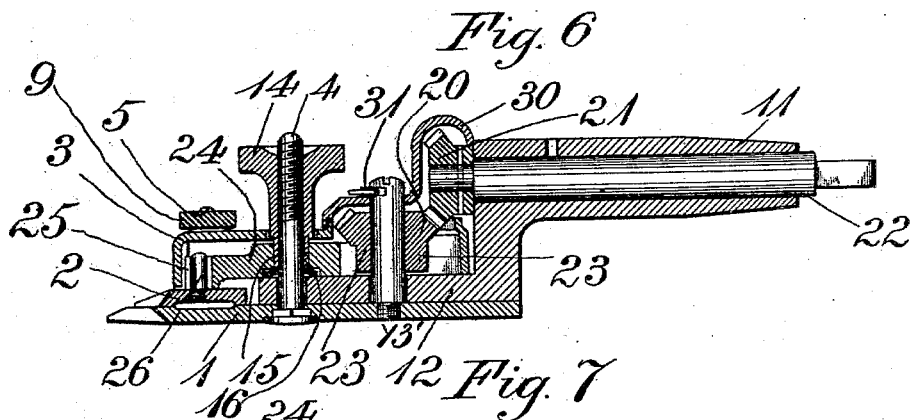
Figure 7:
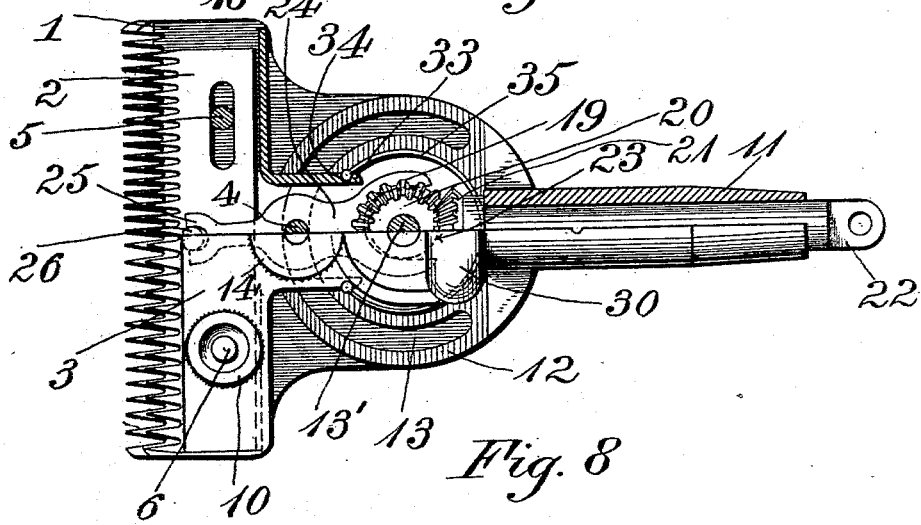

Referring to the accompanying drawings: Figure 1, represents a plan view of my improved clipper, with the series of shearing teeth adjusted at right angles to the axis of the tool-spindle. Fig. 1ª, is a side view of Fig. 1, taken partly in section at $y-y$; Fig. 2, a plan view partly in section, showing the series of shearing teeth adjusted at right angles to that of the position shown in Fig. 1; Fig. 3, a front end view, partly in section, of Fig. 1; Fig. 4, a plan view showing one of the spring-lock washers used in the device for compressing the shearing plates together; Fig. 5, an inverted plan view, showing one of the compressing nuts used in conjunction with said washers; Fig. 6, a longitudinal section of Fig. 1, taken on the line $x-x$; Fig. 7, a plan view partly in section showing a modification in the construction; and Fig. 8, a side view partly in section, of Fig. 7.

1, represents the stationary or comb-plate, 2, the cutter-plate, each said plate bearing the usual series of shearing teeth transverse to the axis of the tool.

3 is the housing, or cap-plate, whereby pressure is brought to bear on the cutter-plate 2, by means of studs 5 and 6, projected from the comb-plate 1, clamping nuts 9 and 10, and spring-washers 7 and 8.

The housing 3 rests at 3′ on the frame of the tool (Fig. 1ª) and there are projections at 3″ underneath the housing that bear against the surface of the cutter plate near the teeth thereof to keep such teeth in shearing contact with the teeth of the comb-plate. In other respects, the housing 3, is out of contact with the tool, being separated from the comb plate at 3‴ and from the disk 12, at 3⁗ as seen in Fig. 1ª.

The shank 11, bears a disk 12, having a segmental slot 13, which disk is pivoted upon the stud 13′, projected from the comb-plate 1. The clamping stud 4, also projected from the comb-plate, extends through the slot 13, and is provided with a clamping nut 14, which bears at its lower extremity on the inverted cup-shaped washer 16, (Fig. 6) bearing frictionally on the margins of the slot 13, when said nut is clamped. The stud 13′, forming a pivot for the disk 12, also serves as a support for the beveled gear 20, and eccentric 23, integral with said gear. The beveled gear 20, is driven by the beveled gear 21, upon the spindle 22, in the shank 11, of the tool, adjustable about the center of the stud 13′, whereby the transmission of rotation to the gear 20, is unaffected by the angular adjustment of said shank, with reference to the comb-plate 1. The beveled gears 20, 21, are covered with a removable cap 30, retained upon the housing 3, by means of a spring-pawl 31, fitting the niche, in the upper part of the stud 13′, projecting through said cap 30. The lower portion 15, of the clamping nut 14, serves as a pivot, upon which the vibrating arm 24, is placed, which arm is provided with a yoke 19, Figs. 2 and 7, at one extremity, actuated by the eccentric 23, and with a yoke 25, at the other extremity, which engages the pin 26, projected from the cutter-plate 2, whereby reciprocatory motion is imparted to the plate 2, by means of the said cam 23.

Figure 8:
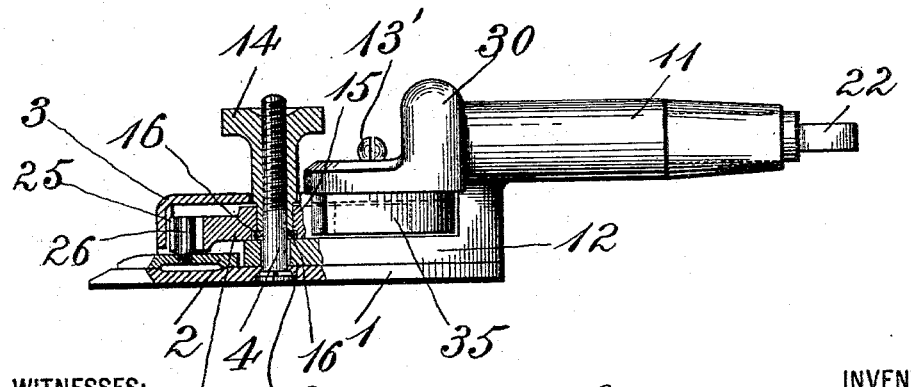

Referring to the modification in Figs. 7 and 8, the housing 3, in lieu of surrounding the gear 20, and cam 23, as in the preceding figures, terminates with beveled edges at 33, and is provided with notches 34, wherein the extremities of the spring 35, engage when the parts are placed together. The spring 35, forms the inclosure for the said gear 20, and cam 23, beneath the cap 30, allowing the tool to be conveniently taken apart, while the interior mechanism is protected from dust and dirt.

In the use of the invention, the spindle 22, is attached to a suitable flexible shaft, and the shank 11, inserted into its flexible tubular case inclosing said shaft. The angular adjustment of the cutter, as shown in Fig. 2, enables the operator to shear the hair upward for instance at the fetlocks of a horse in proximity to the floor, or to cut close to the animal's body at hollow portions in the contour thereof more readily than could be done were the cutter permanently fixed in transverse relation to the shank of the tool in such position as indicated in Fig. 1.

Having thus fully described my invention, what I claim, and desire to secure by Letters Patent, is—

1. In a clipping machine, the combination with a comb-plate, a movable cutter plate, a driving mechanism and means for imparting motion therefrom to the cutter plate, a support for said driving mechanism, having a disk to which said comb-plate is pivoted, provided with a segmental slot, a clamping stud projected from the comb-plate through said slot, and a clamping nut on said stud.

2. In a clipping machine, the combination of a comb plate, a movable cutter plate, a driving mechanism and support for the same, bearing a disk upon which the comb-plate is angularly adjustable on a pivotal stud, an eccentric on said pivotal stud connected to the driving mechanism, an oscillatory arm for imparting motion from the eccentric to the cutter plate, and a clamping stud projected from the comb plate provided with a clamping device for the disk, also forming a fulcrum for said arm.

3. The combination with the herein described comb-plate, the cutter plate, the driving mechanism, the support therefor having a clamping disk 12, and the clamping stud 4, the oscillatory arm 24, connected to cutter plate, and means for actuating said arm, of a clamping nut 14, on said stud, provided with a compressing sleeve 15, bearing at its lower extremity on the said disk, also forming a pivotal journal for the said arm.

4. The combination in a clipping machine, of a comb plate, a movable cutter plate, an eccentric and means for imparting motion therefrom to the cutter plate, a tool body upon which the comb plate is angularly adjustable, and a pivotal stud, forming the axis of said adjustment, and also the axial support of said eccentric.

5. The combination in a clipping machine, of a comb-plate, a movable cutter plate, a rotary driving spindle, a support for the spindle provided with a disk upon which the comb plate is angularly adjustable, a pivoted stud projected from the comb plate forming the axis of said adjustment, an eccentric upon said stud intermeshing beveled gears for imparting motion from the spindle to the eccentric, irrespective of said adjustment, an oscillatory arm for imparting motion from the eccentric to the cutter plate, and a clamping stud independent of the said pivotal stud, forming a fulcrum for the said arm.

6. The combination with the comb plate, the cutter plate, the cap plate or housing, and the clamping studs 5, 6, of warped spring lock washers 7, 8, having means for preventing their rotation and provided with knurled surfaces, and the clamping nuts 9, also provided with knurled surfaces engaging with those of the said washers for the purpose described.

7. The combination with the comb plate 1, the tool body 11, 12 the housing 3 and the cutter and mechanism for driving it, of the inclosing spring 35, and cap piece 30, and means substantially as described for holding said spring and cap piece in place.

In testimony whereof I have hereunto set my hand this 9th day of January, 1893.

EDWARD A. COCHRAN.

Witnesses:
H. F. PARKER,
HENRY KLEIN.